May 28, 1968   E. B. WILLIAMS, JR   3,385,683
METHOD OF MAKING AND APPLYING AN ABRASIVE TO METAL SURFACES
Filed Dec. 9, 1963
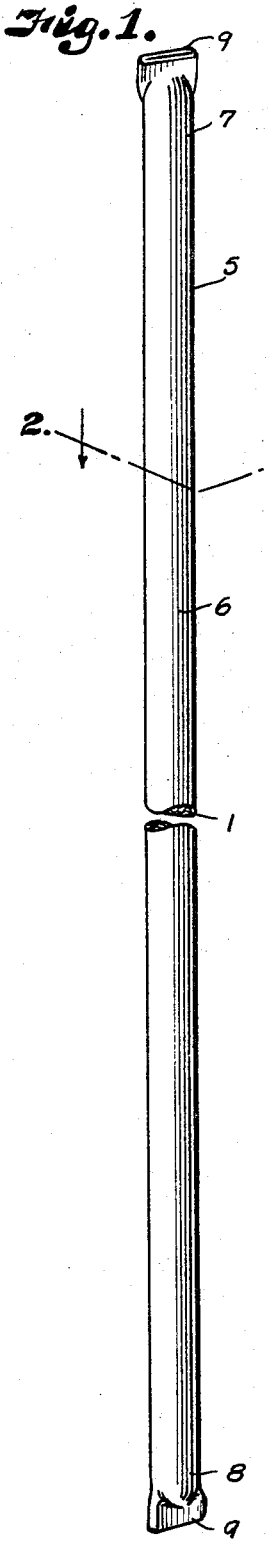
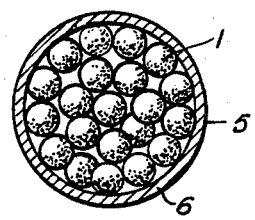
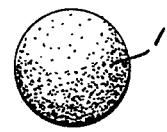
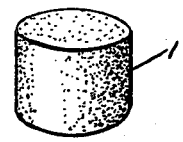
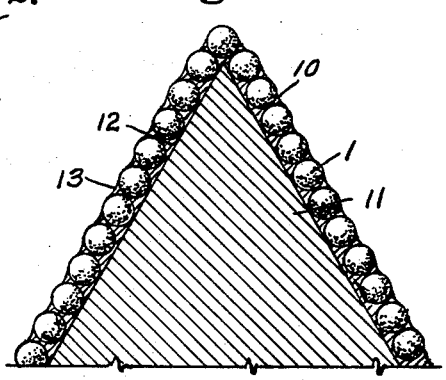
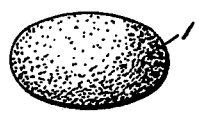
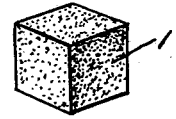
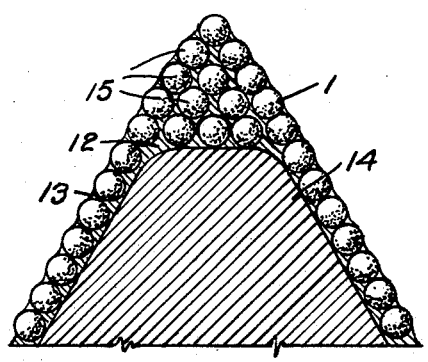
INVENTOR.
Edward B. Williams Jr.
BY
Paul E. Mullendore
ATTORNEY.

United States Patent Office 3,385,683
Patented May 28, 1968

3,385,683
METHOD OF MAKING AND APPLYING AN ABRASIVE TO METAL SURFACES
Edward B. Williams, Jr., Greenville, Tex., assignor of one-third each to Edward B. Williams III, Joseph W. Williams and David B. Williams, Greenville, Tex., respectively
Filed Dec. 9, 1963, Ser. No. 328,820
10 Claims. (Cl. 51—293)

This invention relates to a method of making and depositing abrasive elements upon metal surfaces to enable such surfaces to resist wear and/or to provide abrasives thereon.

For example, it is the present practice to apply tungsten carbide grits to build up worn teeth of the cone cutters of drill bits, or to coat the teeth of such cutters so that they will be more effective. The tungsten carbide material as heretofore used consists of particles reduced to size by crushing larger particles until they have been reduced to a size that will pass through a screen having a desired mesh. Thus the tungsten carbide grits are of any size that will pass the mesh of the screen and are of extremely irregular shapes.

One method of applying such grits is by use of welding rods consisting of a thin-walled metal tube which contains the grits therein. Such rods are known as "grit rods" and may be obtained in various diameters, with various sized grits. In using the previous rods as above described, the metal of the tube melts down and carries the grits onto the teeth of the cutter or other surface to be coated.

Another method is to coat the surfaces with an adhesive such as water glass, sprinkle the grits on the adhesive to hold them in place, and then "burn" them into the metal surface by a welding torch.

Since, as above stated, the grits have been crushed to size, they are obviously of random shapes and have points and fissures which handicap the grits from being laid down flatly in a uniform coating upon the surface of the work. Instead, the irregular particles tend to pile up and make a coating of varying thickness. Consequently, when the work is a cone cutter of a drill bit, the teeth do not bear with uniform pressure on the formation being drilled. Moreover, the points and fissures of the grits and voids therebetween are weaknesses that cause the grits to crush and break down under resistance to rotation and load of the drill pipe on the drill bit.

It is, therefore, the principal object of the present invention to provide abrading elements of regular geometric shapes, such as spheres, cylinders, ovoids, cubes, and the like, that can be laid down smoothly in uniformly flat layers, so that the abrading elements better resist crushing under heavy loads.

It is a further object of the invention to provide an improved method of making the abrading elements.

A further object is to provide an improved welding rod which incorporates the tungsten carbide elements of the present invention.

In accomplishing these and other objects of the invention as hereinafter described, improved structure has been provided, the preferred forms of which are illustrated in the accompanying drawing, in which:

FIG. 1 is a perspective view of a welding rod containing abrading elements of a form and produced in accordance with the method of the present invention.

FIG. 2 is a greatly enlarged cross section through the rod, showing the abrasive elements therein, and taken on the line 2—2 of FIG. 1.

FIG. 3 is a perspective view of a preferred shape of abrasive elements used in the makeup of the welding rod shown in FIGS. 1 and 2.

FIGS. 4, 5 and 6 show modified shapes of abrasive elements that accomplish the results of the invention.

FIG. 7 is an enlarged section through a mould having a cavity of the geometric shape of a sphere and containing the mixture of powders making up an abrasive element of the present invention.

FIG. 8 is an enlarged section through a tooth of a rolling cutter of a rotary drill bit, coated with the elements shown in FIG. 3.

FIG. 9 is a similar view showing a worn tooth built up with a welding rod containing abrading elements of the present invention.

Referring more in detail to the drawing:

The abrading elements 1 of the present invention are small spheres, cylinders, or ovoids brought to shape and size prior to cementing of the component materials thereof together in the shapes as shown in FIGS. 3 to 5. In FIG. 3 the abrading element is shown in the shape of a sphere. In FIG. 4 the abrading element is in the shape of a cylinder having a height substantially equal to the diameter thereof. In FIG. 5 the abrading element is an ovoid, and in FIG. 6 the abrading element is in the shape of a cube. While rounding shapes of FIGS. 3, 4 and 5 are most preferable, the most satisfactory shape is the sphere or ball shown in FIG. 3. However, it is to be understood that the elements may be of other preformed geometrical shapes that are free of points and acute angles, fissures, or defects that weaken their structure or prevent them from being laid down in uniform layers. The abrading elements 1 are most suitable in sizes that will pass through screens having meshes of from 10 to 80 meshes per inch.

The component material making up the elements 1 are finely powdered tungsten, tungsten and carbon, tungsten carbide or other hard abrasion-resisting powders mixed with finely powdered metals such as cobalt, nickel, and metals customarily used in making cemented carbide. The powders are mixed together and cold pressed in moulds having cavities conforming to the shape of the finished product, for example, spherical, cylindrical, ovoidal, or cubical, as shown, and similar geometric shapes free of points.

The mixed powder is compressed in the moulds 2 having cavities 3 for containing and shaping the powder 4 under sufficient pressure for the elements, when removed from the mould, to be self sustaining. The compressed powders making up the elements 1 are then cemented together in their compressed form by placing the elements in a furnace with controlled atmosphere, which may be in atmosphere of hydrogen, carbon dioxide, methane, propane, or butane gas, and bringing them to a temperature which will cement the particles together without causing the components to melt or altering the gometrics shapes of the elements.

When thus produced, the elements are all of like shape and size, are of the same density and hardness, and no screening is required.

The abrading elements thus produced are preferably used in a welding rod 5 which consists of a thin-walled metal tube 6, preferably of mild steel, although other metals or alloys may be used, such as bronze, depending upon the work on which the rod is to be used. The tube 6 may be of various diameters, for example, from ⅛ to ⅜ or more inches outside diameter. The wall thickness of the tube may also vary, depending upon the bonding or welding metal that may be required for the particular job.

The tube 6 is filled with abrading elements 1, and the ends 7 and 8 of the tube are closed, for example, by welding or by pinching or crimping as indicated by the numeral 9, to retain the elements 1 therein. The finished rods may be of short lengths as shown, or in the form of coils, as desired.

The welding rods 5 are used in the customary manner, with the metal of a tube 6 melting down and carrying the elements 1 in a uniform layer 10 onto the work 11, to form a weld 12 with the work and to flow around the elements for bonding them together, as shown at 13 in FIG. 8. The heat of welding deposits the elements 1 so fast that there is practically no reaction of the components of the elements and they retain their original shape.

While the process of moulding the elements 1 to shape has been described, the invention also contemplates shaping thereof by tumbling or other shaping method.

Balls and similar rounded shapes when welded on the cutting surface of drill bits as shown in FIG. 8 are better able to resist crushing under the tremendous weight of the drilling string. Also, being resistant to crushing, they are usable over a longer period of time and result in faster drilling because they are more effective in cutting away earth formations.

While it is desirable that the welding rods incorporate abrading elements all of like shape and size, the sizes may be mixed, but the sizes are selected and they are all preshaped in their powder state. Thus, if balls are selected, all of the abrading elements are preformed balls, regardless of their size.

In FIG. 9 is illustrated the invention as used for rebuilding worn teeth 14 of a rolling cutter of a rotary drill bit. It will be noted that the abrading elements 1 having the form of balls are built up in layers 15 to the original contour of the tooth, and that the welding metal follows the surface of the balls.

The preshaped abrading elements of the present invention may be applied by coating the surfaces of the teeth with an adhesive such as water glass. The abrading elements are then sprinkled upon the adhesive to hold them in place. The preshaped abrading elements are then "burned" or "sweated" into the surface of the metal by a welding torch.

What I claim and desire to secure by Letters Patent is:

1. The method of producing a hard, long wearing, load bearing surface on a rotary drill bit, comprising
   mixing finely ground tungsten powder with finely ground metallic bonding powder for cementing granules of the tungsten particles together,
   pressing the mixed powders in cavities having a geometric shape and free of acute angles to form individual masses having the contour of said cavities,
   cementing the particles composing said masses together by heat to produce solid elements of geometric shape and uniform density and hardness without causing the powders to melt and alter said geometric shape,
   enclosing said elements of geometric shape in a tubular metal welding rod,
   and melting down the welding rod to lay down said elements in a uniform layer upon surfaces of said drill bit with the metal of said tube flowing uniformly around said elements for bonding them together and securing the elements to said surfaces.

2. The method of producing a hard, long wearing, load bearing surface on a rotary drill bit, as described in claim 1,
   in which said masses are molded under pressure in spherical cavities to provide spherical elements.

3. The method of producing a hard, long wearing, load bearing surface on a rotary drill bit, as described in claim 1,
   in which said masses are molded under pressure in cubical cavities to provide cubical elements.

4. The method of producing a hard, long wearing, load bearing surface on a rotary drill bit, as described in claim 1,
   wherein said masses are molded in cylindrical cavities each having a height substantially equal to the diameter thereof to provide cylindrical elements having heights substantially the same as their diameters.

5. The method of producing a hard, long wearing, load bearing surface on a rotary drill bit, as described in claim 1,
   in which said masses are molded in ovoid shaped cavities to provide elements of ovoid shape.

6. The method of producing a hard, long wearing, load bearing surface on a rotary drill bit, as described in claim 1,
   wherein the powders include a carbon powder along with the tungsten cementing powder.

7. The method of producing a hard, long wearing, load bearing surface on a rotary drill bit, as described in claim 1,
   wherein the tungsten is included as tungsten carbide.

8. The method of producing a hard, long wearing, load bearing surface on a rotary drill bit, as described in claim 1,
   wherein the powders include a carbon powder along with the tungsten and cementing powders.

9. The method of producing a hard, long wearing, load bearing surface on a rotary drill bit, as described in claim 1,
   wherein the cementing powder is cobalt.

10. The method of producing a hard, long wearing, load bearing surface on a rotary drill bit, as described in claim 1,
    wherein the cementing powder is nickel.

References Cited

UNITED STATES PATENTS

| | | | |
|---|---|---|---|
| 1,757,601 | 5/1930 | Stoody et al. | 219—145 |
| 1,977,128 | 10/1934 | Hawkins | 51—309 |
| 2,737,454 | 3/1956 | Danec | 51—309 |
| 3,183,071 | 5/1965 | Rue et al. | 51—298 |

ALEXANDER H. BRODMERKEL, *Primary Examiner.*

DONALD J. ARNOLD, *Examiner.*